UNITED STATES PATENT OFFICE.

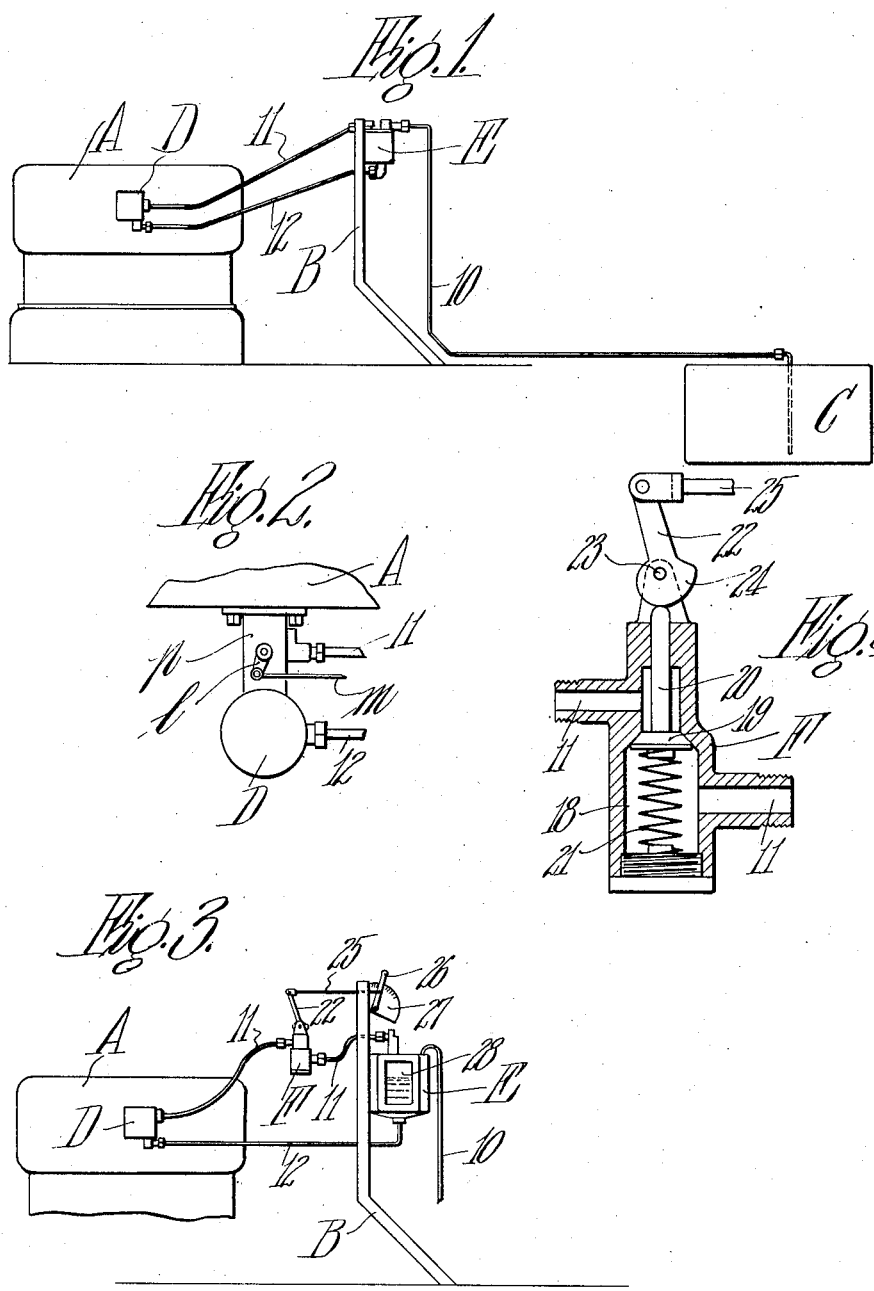

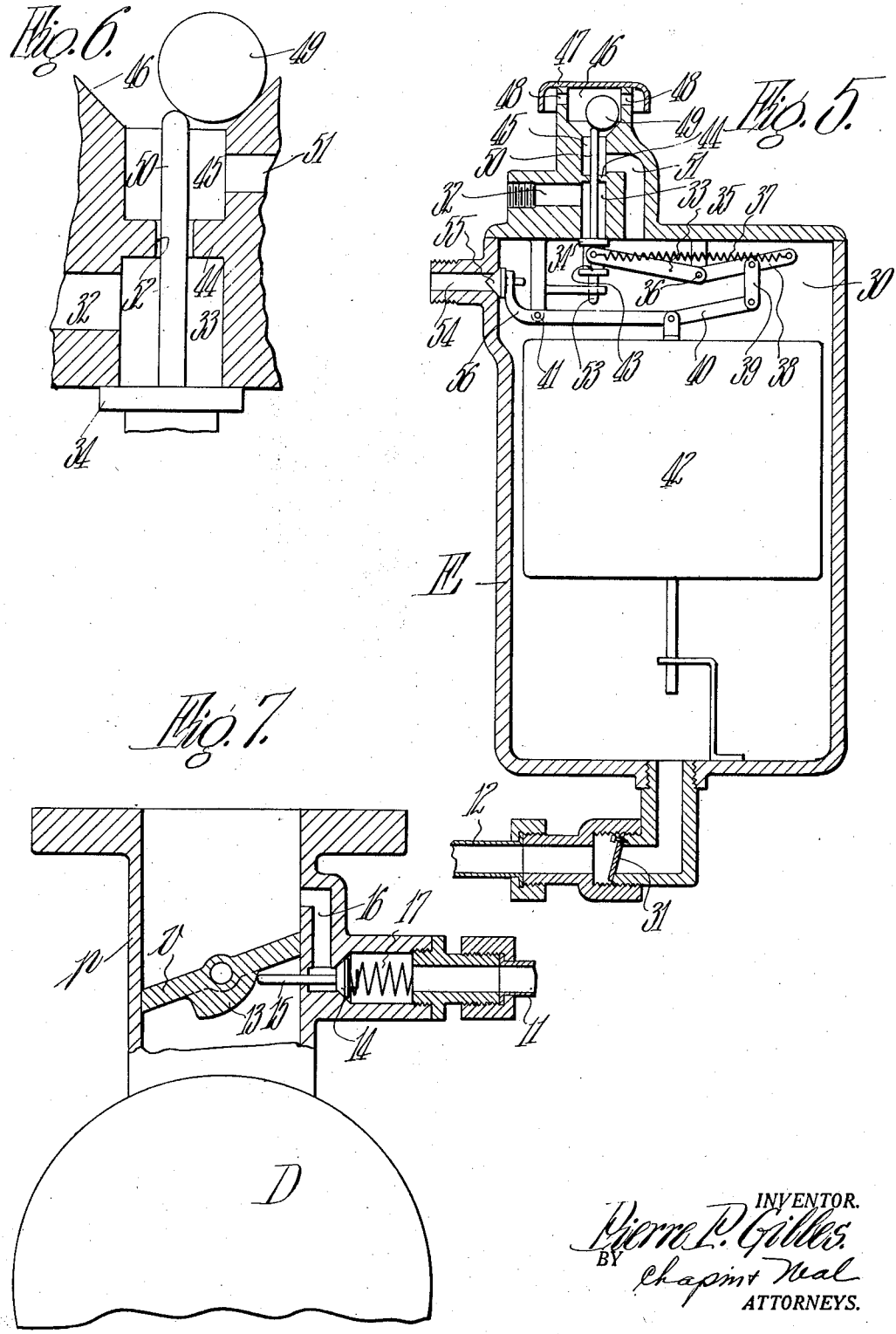

PIERRE P. GILLES, OF SPRINGFIELD, MASSACHUSETTS.

FUEL-FEEDING APPARATUS.

1,330,798.  Specification of Letters Patent.  Patented Feb. 17, 1920.

Application filed February 12, 1919. Serial No. 276,645.

*To all whom it may concern:*

Be it known that I, PIERRE P. GILLES, born in Switzerland of German parentage, now believing myself to be a citizen of the Swiss Confederation, and having formally declared my intentions of becoming a citizen of the United States of America in conformance with the United States immigration laws, and now residing at Springfield, in the county of Hampden and State of Massachusetts, United States of America, have invented certain new and useful Improvements in Fuel-Feeding Apparatus, of which the following is a specification.

This invention relates generally to fuel feeding apparatus, designed to automatically supply the carbureter of an internal combustion engine from a low level fuel supply tank.

Apparatus of this general character has been provided heretofore, as I am well aware, and includes generally, as a part thereof, a fuel feeding device, which involves a chamber arranged to be alternately subjected to partial vacuum and atmospheric pressure, for the respective purposes of causing fuel to flow therein from the low level tank and to flow therefrom to the carbureter. Generally the described chamber does not deliver directly to the carbureter but to a second compartment, which holds a reserve supply of fuel to be fed to the carbureter from time to time as required.

This invention is concerned, among other things, with the provision of a fuel feeding device, which may be mounted on the dash of an automobile so as to be visible to the operator thereof at all times. For this desired purpose, the fuel feeding device must be made as small as possible and the fuel feeding devices of the prior art, are, so far as I am aware, not particularly suitable for the contemplated use on this account. Not only are they bulky, by reason of the reserve supply tank, but they are also relatively slow acting and therefore necessarily relatively large, all of which makes them undesirable for use in the planned location.

According to one feature of this invention, a fuel feeding device of relatively small capacity is provided, which device, by reason of its reduced size, may be mounted on the dash of the automobile and visible at all times to the operator. The feeding device is characterized by the elimination of the usual fuel reserve chamber and the fuel feeding chamber is connected directly to the carbureter. To offset the reduced volume of the feeding chamber and the elimination of the reserve chamber, a suction passage is provided, which is of large cross sectional area relatively to the volume of the feeding chamber. In addition, the suction passage is valve controlled so that the degree of suction may be proportioned according to requirements.

According to another feature of the invention, a valve unit is provided, separate from both carbureter and feeding device, which unit is adapted to be interposed in the suction line from the intake manifold of the engine to the feeding device and is provided with means, whereby it may be manually operated in accordance with the will of the operator, the fuel feeding device preferably having a transparent portion in its wall to permit the operator to see at a glance the level of fuel therein.

According to another feature of the invention, a quick acting fuel feeding device is provided which has necessarily a suction passage of a cross sectional area relatively large with respect to the volume of the feeding chamber, in order to subject the latter to relatively high degrees of suction and thereby accomplish the quick acting function. With such an arrangement the usual means, for actuating the air and suction valves from a float in the feeding chamber, are hardly suitable inasmuch as a relatively large amount of power is required to operate the air valve and break the vacuum and, according to this feature of the invention, improved valve actuating mechanism is provided for this purpose. This feature of the invention is likewise characterized by the provision of an arrangement to prevent the establishment of a perfect, or nearly perfect vacuum, above the suction valve during such times as it is in closed position, thereby facilitating the subsequent operation of such valve.

Other features of the invention will appear in the following description and in the illustrative embodiment of the invention in the accompanying drawings, in which:

Figure 1 is a diagrammatical elevational view of the apparatus shown as mounted on an automobile;

Fig. 2 is a fragmentary plan view of a portion of Fig. 1, showing the carbureter, throttle linkage and suction pipe for the fuel feeding device;

Fig. 3 is a view generally similar to Fig. 1 but showing a modification in detail, and particularly the mechanism for operating the suction valve from the dash of the automobile;

Fig. 4 is a sectional elevation of the suction valve unit shown in Fig. 3;

Fig. 5 is a sectional elevation of the fuel feeding unit of the apparatus;

Fig. 6 is an enlarged fragmentary view of a portion of the device shown in Fig. 5; and Fig. 7 is an enlarged plan view, partly in section, of the carbureter unit, showing the suction valve as incorporated therein and arranged for operation from the throttle valve.

Referring to these drawings and particularly to Fig. 1; A represents the engine of an automobile, B the dash of the automobile, and C the low level fuel supply tank, the several members A, B and C being shown merely in a conventional way to illustrate their relative location. The carbureter of the engine A is indicated generally by reference letter D and the fuel feeding device by reference letter E. As shown, the fuel feeding device E is mounted on dash B and in such a location that it can readily be observed by the driver of the automobile. A pipe 10 connects the fuel supply tank C to the upper portion of the fuel feeding device E and such portion is likewise connected by a pipe 11 to a source of suction, as the intake pipe $p$ (Fig. 2) of carbureter D, a third pipe 12 leads from the lower portion of the device E to the fuel chamber of the carbureter D.

The fuel feeding device E will be later described in full detail but, first, it is desired to describe the valve by means of which the degree of suction, effective upon the fuel feeding device, may be varied. According to the arrangement shown in Figs. 1 and 2, the variation of the suction is accomplished automatically by arranging the suction valve for actuation by, or from, the throttle valve of the carbureter. Thus, as shown in Fig. 7, the throttle valve $v$, of carbureter D, has a cam 13 provided thereon and the suction valve, indicated at 14, has its stem 15 slidably mounted in the wall of pipe $p$, so that the end of the stem rides on cam 13. Valve 14 is arranged to open and close a passage 16, which communicates at one end with pipe $p$ and at the other end with the described suction pipe 11 leading to the fuel feeding device E. A spring 17 yieldingly holds the stem 15 against cam 13. The arrangement in such that valve 14 is closed by the spring when throttle $v$ is closed, and so that valve 14 is opened by, and substantially in proportion to, the opening of the throttle valve. Thus, the suction, effective upon the fuel feeding device, may automatically be proportioned substantially in accordance with the consumption of fuel from carbureter D. The throttle valve $v$ is operable by means of a lever $l$, and suitable connections, exemplified in part by the link $m$ (Fig. 2), all in the usual and well known manner.

The variation of the suction may also be accomplished manually at the will of the operator, as shown in Fig. 3. With this arrangement, it is preferred to provide the valve as a separate unit, represented generally by F. This unit is adapted to be interposed in the suction pipe 11. As shown in Fig. 4, the unit F has an internal bore or passage 18, the ends of which are adapted for connection to the pipe 11. Intermediate the ends of passage 18 is a valve 19, having a stem 20 slidably mounted in, and projecting from, the casing of unit F. A spring 21 tends to hold valve 19 in the closed position illustrated, wherein communication between the ends of passage 18 is prevented. A lever 22, pivoted at 23, is provided with a cam-like lower portion 24 to engage and depress valve 19, thereby permitting communication between the ends of passage 18. Cam 24 is constructed to open valve 19 proportionately with the degree of swinging movement of lever 22 and the latter is connected by a link 25 to a lever 26, which is mounted on dash B and arranged to be held in any of the various positions, to which it may be moved, by any suitable means, such as that conventionally indicated at 27 in Fig. 3.

It will thus be seen that the driver of the automobile may, by moving lever 26, vary the effective opening through which suction may act on the feeding device and such variation is accomplished independently of the throttle valve of the carbureter. When manual regulation of the suction is desired, it is preferred to provide a transparent portion, as the window 28 (Fig. 3), in the wall of the feeding device, so that the driver may readily observe the level of fuel therein and manipulate the lever 26 in accordance with requirements, as indicated by the level of fuel.

Having described the general arrangement of the various units of the apparatus, the construction of the fuel feeding device will next be considered and particularly with relation to those structural details which render the device suitable and desirable for use with apparatus of the class described.

Referring particularly to Fig. 5; the fuel feeding device E includes a substantially air tight chamber 30, the volume of which is relatively small compared to that of the fuel feeding devices generally used and compared to that of the carbureter D itself. Into chamber 30, fuel from tank C may be drawn by partially vacuumizing the chamber and from the latter the fuel flows directly into the feed pipe 12 and thence to the carbureter, there being no reserve supply for fuel, as is usual. The outflow of fuel from the chamber is effected by gravity flow, after the suction connection to chamber 30 has been closed and as soon as air is admitted to the chamber. A suitable outwardly opening check valve 31 is provided to control the outflow of fuel from chamber 30 in the usual manner.

The suction pipe 11 is adapted for connection with a horizontal passage 32 in the upper wall of chamber 30, and passage 32 intersects with the upper end of a vertical passage 33, which may, from time to time, communicate at its lower end with chamber 30. Passages 32 and 33, as shown, are of large cross sectional area with relation to the volume of chamber 30. The communication between passage 33 and chamber 30 is controlled by a suction valve 34. Such valve is supported by the free end of a lever 35, pivoted at 36, and such free end is connected by a spring 37 to the free end of a second lever 38 also pivoted at 36. Lever 38 is connected, at a point intermediate its ends, by a link 39 to the free end of a lever 40 and the latter is pivoted at 41 to the casing of the feeding device E. Lever 40 is pivotally connected, at a point intermediate its ends, to a float 42, which is suitably guided, as illustrated, in the chamber 30.

The general arrangement of parts, as described, is a known means for producing a sudden movement of the suction valve from the gradual movement of the float 42. Thus, as the float 42 descends, the lever 40, link 39 and lever 38 are moved but the lever 35, which supports valve 34, is not moved until the spring 37 passes from above to below the pivot 36, at which time the lever 35 is sharply moved downwardly and, by abutment with a shoulder 43 on the valve 34, opens the latter very suddenly. Special details of the means for operating the suction valve 34, should however, be observed, since they have an important bearing in rendering the fuel feeding device suitable and effective for use in the special manner disclosed. For example, the movement of lever 40 by the float 42 results in a movement of the link 39 greater than that of the float and such link is so connected to the lever 38 that the free end of the latter is moved a greater vertical distance than the link. Thus, the movement of the valve actuating lever 38 is considerably greater than that of the float and is purposely so, in order to render the fuel feeding device susceptible to relatively small variations in the level of fuel in chamber 30. Moreover, a space is purposely left between the lever 35 and the shoulder 43, in order that the lever may acquire some momentum before engaging the shoulder, thereby the more effectively to dislodge the valve 34 from its seat, to which it is securely held by suction.

In line with and above passage 33 but partitioned therefrom by a partition 44, is an air passage 45, which extends upwardly and terminates with an enlargement 46. The latter is covered by a cap 47 and, below the cap, inlet openings 48 are provided in the wall of passage 46 to admit air. The intersection of passages 45 and 46 affords a seat for a ball valve 49. The latter is held in open position, as illustrated, by a stem 50, fixed to and upstanding from the valve 34. When the latter is opened, stem 50 falls sufficiently to allow ball 49 to seat and prevent entrance of air to passage 45. The latter is connected with chamber 30 by a passage 51.

It is particularly to be noted that stem 50 loosely passes through the partition 44, so that an annular clearance space 52 is provided, as shown in very much magnified form in Fig. 6. This space is particularly important in a fuel feeding device of the present character and its utility will now be pointed out. Assuming that the suction valve 34 is in closed position, the ball 49 is in open position to admit air to chamber 30. At such times as ball 49 is in open position, air flows in through space 52 and prevents the creation of a vacuum of high degree in the passage 33, which might otherwise happen. A high vacuum in passage 33 might well prevent the opening of valve 34, by the float operated mechanism described. At any rate, much stronger mechanism would have to be provided than that illustrated, and, in such event, the fuel feeding device would have to be larger and more bulky to house such mechanism. The space 52 then has a particular value in the present apparatus and the provision of the space is not detrimental at other times for, when valve 34 is open, ball 49 is closed, so that the suction effective upon chamber 30 is not impaired.

It is also to be noted that valve 34 has a depending extension 53 which is purposely arranged in the path of the float operated lever 40 already described. The extension 53 is arranged to be engaged by the lever at a point quite close to its fulcrum 41. whereby a force may be imparted to the extension greater than that due to the buoyancy of the float 42. When the valve 34 is in its lower position, and float 42 is also in its lower position, the lower end of extension 53 is spaced above lever 40. The spacing is such that lever 40 will engage the extension at, or just prior to, the time when spring 37 is about to snap the valve 34 upwardly. The purpose of such engagement is to apply a larger initial force to the stem 50 than would be had by reason of spring 37, in order to dislodge ball 49 from its seat, to which it has hitherto been held by suction. The arrangement described supplements the action of the usual valve operating mechanism and insures the opening of the air valve. This arrangement is particularly important in a fuel feeding device of the present character, where the suction passages are larger, and the valves are held more tightly to their seats by suction, than in the usual types of apparatus.

The fuel feed pipe 10, already described, is adapted for connection to the fuel inlet passage 54 (Fig. 5) and such passage is preferably also valve controlled. Thus, a valve 55 is provided on an extension 56 of the described lever 40. The valve 55, by reason of its location on the opposite side of pivot 41 from the suction valve operating link 39, will start to open immediately on that movement of lever 40, which eventually causes an opening of the suction valve 34 and a closing of the air valve 49, and conversely it will start to close immediately on that movement of lever 40, which eventually results in the opening of the air valve 49 and a closing of the suction valve 34. The practical effect of this arrangement is a closing of the fuel valve slightly before the opening of the air valve.

The operation of the fuel feeding device will sufficiently appear from the foregoing description.

Thus, I have provided a generally improved fuel feeding device which is particularly suitable, by reason of its small volume for the special use described. The fuel feeding device is furthermore characterized by the provision of sensitive, quick acting valve mechanism and by the provision of special means supplementary to such mechanism to aid or insure their effective operation.

The invention has been disclosed herein in an embodiment, at present preferred, for illustrative purposes but the scope of the invention is defined by the appended claims rather than by the foregoing description.

What I claim is—

1. Fuel feeding apparatus for internal combustion engines, comprising, a carbureter connected to the engine manifold to directly deliver fuel thereto, a main fuel supply tank at a lower level than said carbureter, a fuel feeding device at a higher level than the carbureter and having a single fuel supply chamber of relatively small volume, a suction pipe connecting said chamber to the engine, a fuel pipe connecting the chamber to said tank, a feed pipe connecting the chamber to the carbureter, a float in said chamber, means controlled by the float operable to draw fuel into said chamber from said tank, and a valve associated with the suction pipe and arranged to automatically vary the effective opening thereof to control the degree of suction effective on said chamber independently of the fuel level therein.

2. In a fuel feeding device for carbureters, a casing having a fuel supply chamber, air and suction passages provided in the casing, a partition separating the adjacent ends of said passages, the other end of the suction passage communicating with said chamber and the other end of the air passage being the inlet for air, a valve to open and close the suction passage, a valve to open and close the air passage, a passage connecting the latter at a point between the air valve and said partition to said chamber, a passage communicating with said suction passage at a point between said partition and suction valve and adapted for connection to suction means, means including a member extending through said partition to connect said valves for simultaneous operation and arranged so that one valve is open when the other is closed, and a relatively small annular passage provided between the partition and said member to connect the air and suction passages to prevent the creation of a high degree of vacuum in the suction passage while the suction valve is closed.

3. In a fuel feeding device for carbureters, a casing having a fuel supply chamber, a float in the latter; a suction connection, a fuel inlet, a fuel outlet and an air inlet provided for said chamber, a valve to open and close said air inlet, mechanism operable by the gradual rise and fall of the float to suddenly open and close said valve when the fuel in the chamber rises or falls to predetermined levels, and supplementary means operable from the float to engage and initially move said valve as the float reaches its predetermined upper position, said means arranged to exert a greater force on said valve than that exerted by said mechanism for the purpose of effectively breaking the vacuum by which the valve is held to its seat.

4. In a fuel feeding device for carbureters, a casing having a fuel supply chamber, a float in the latter, a suction connection, a fuel inlet, a fuel outlet and an air inlet provided for said chamber, a valve to open and close said air inlet, mechanism operable by the gradual rise and fall of the float to suddenly open and close said valve when the fuel in the chamber rises or falls to predetermined levels, said mechanism constructed so as to produce a relatively large movement of the valve from a relatively small movement of the float, whereby the valve is quick acting and susceptible to relatively small variations in the fuel level.

5. In a fuel feeding device for carbureters, a casing having a fuel supply chamber and provided with an inlet for air, an inlet for fuel, an outlet for fuel, and a suction connection; a float in said chamber, a valve for the air inlet arranged to be opened and closed by the rise and fall of the float, a valve for the suction connection arranged to be opened and closed by the fall and rise of the float, a valve for the fuel inlet arranged to be opened and closed by the fall and rise of the float, and mechanism operable from the float arranged to suddenly actuate said air and suction valves, said mechanism including a part arranged to gradually operate said fuel valve.

6. In a fuel feeding device for carbureters having a fuel supply chamber provided with an inlet for fuel, an inlet for air, an outlet for fuel and a suction connection, a float in said chamber, a valve operable by the float to open and close said air inlet when the fuel in said chamber reaches or falls to predetermined levels respectively, a valve to open and close the fuel inlet, and means connecting the last named valve and float so that it is closed after the opening of the air valve.

PIERRE P. GILLES.